(12) United States Patent
Soundararajan

(10) Patent No.: US 10,550,943 B2
(45) Date of Patent: Feb. 4, 2020

(54) AXIAL-SEAL BUTTERFLY VALVE

(71) Applicant: Flowserve Management Company, Irving, TX (US)

(72) Inventor: Sridharan Soundararajan, Tiruchirappalli (IN)

(73) Assignee: Flowserve Management Company, Irving, TX (US)

( * ) Notice: Subject to any disclaimer, the term of this patent is extended or adjusted under 35 U.S.C. 154(b) by 36 days.

(21) Appl. No.: 15/750,458

(22) PCT Filed: Aug. 5, 2016

(86) PCT No.: PCT/US2016/045893
§ 371 (c)(1),
(2) Date: Feb. 5, 2018

(87) PCT Pub. No.: WO2017/024272
PCT Pub. Date: Feb. 9, 2017

(65) Prior Publication Data
US 2018/0231130 A1  Aug. 16, 2018

Related U.S. Application Data

(60) Provisional application No. 62/201,509, filed on Aug. 5, 2015.

(51) Int. Cl.
*F16K 1/22* (2006.01)
*F16K 1/226* (2006.01)
(Continued)

(52) U.S. Cl.
CPC .............. *F16K 1/221* (2013.01); *F16K 1/226* (2013.01); *F16K 1/2268* (2013.01); *F16K 27/0218* (2013.01); *F16K 31/521* (2013.01)

(58) Field of Classification Search
None
See application file for complete search history.

(56) References Cited

U.S. PATENT DOCUMENTS 2,400,568 A   5/1946  Norris
2,998,805 A   9/1961  Usab
(Continued)

FOREIGN PATENT DOCUMENTS

DE   1958387 U   4/1967
FR    722562 A   3/1932
(Continued)

OTHER PUBLICATIONS

First Office Action for Chinese application No. 201680058209.0 dated Jan. 23, 2019, 15 pages.
(Continued)

*Primary Examiner* — Jessica Cahill
*Assistant Examiner* — Daphne M Barry
(74) *Attorney, Agent, or Firm* — Magleby, Cataxinos & Greenwood, P.C.

(57) ABSTRACT

A valve includes a valve body having a fluid flow path extending therethrough, a valve seat located in the valve body, and a valve disc located in the fluid flow path of the valve body. The disc is rotatable between a fully open position and an intermediate position about an axis substantially perpendicular to a longitudinal axis of the disc. The disc is also translatable between the intermediate position and a fully closed position in a direction substantially parallel to the longitudinal axis of the disc. Such a valve may be incorporated into a fluid line of a fluid system.

13 Claims, 8 Drawing Sheets

(51) Int. Cl.
    *F16K 27/02*     (2006.01)
    *F16K 31/52*     (2006.01)

(56) References Cited

U.S. PATENT DOCUMENTS

| | | | | |
|---|---|---|---|---|
| 4,504,038 | A | * | 3/1985 | King ............ F16K 1/221 |
| | | | | 137/75 |
| 4,634,094 | A | | 1/1987 | Geiser |
| 4,669,701 | A | * | 6/1987 | Twiner ............ F16K 1/24 |
| | | | | 251/252 |
| 4,770,392 | A | | 9/1988 | Schmidt |
| 4,817,916 | A | * | 4/1989 | Rawstron ............ F16K 1/24 |
| | | | | 251/162 |
| 4,921,212 | A | * | 5/1990 | deQuay ............ F16K 1/24 |
| | | | | 251/160 |
| 4,964,431 | A | * | 10/1990 | Ball ............ F16K 1/221 |
| | | | | 137/1 |
| 4,967,997 | A | * | 11/1990 | Hines ............ F16K 1/221 |
| | | | | 251/258 |
| 5,108,073 | A | * | 4/1992 | Adachi ............ F16K 31/5282 |
| | | | | 251/163 |
| 5,330,157 | A | | 7/1994 | Dern et al. |
| 6,042,083 | A | | 3/2000 | Lee |
| 6,135,416 | A | * | 10/2000 | Keene ............ F16K 1/24 |
| | | | | 251/162 |
| 9,506,571 | B1 | * | 11/2016 | McCormack ............ F16K 1/221 |
| 2010/0018587 | A1 | * | 1/2010 | Marshall ............ F16K 1/221 |
| | | | | 137/270 |

FOREIGN PATENT DOCUMENTS

| | | |
|---|---|---|
| GB | 1341205 A | 12/1973 |
| KR | 10-0592827 B1 | 6/2006 |
| NL | 8702682 A | 6/1989 |
| RU | 2170869 C1 | 7/2001 |
| SU | 983364 A1 | 12/1982 |

OTHER PUBLICATIONS

Extended European Search Report for European application No. 16833970.3 dated Mar. 6, 2019, 11 pages.
Office Action for Russian application No. 2018107661 dated Nov. 30, 2018, 12 pages.
International Search Report and Written Opinion for International application No. PCT/US2016/045893 dated Nov. 21, 2016, 14 pages.
International Preliminary Report on Patentability for International application No. PCT/US2016/045893 dated Feb. 15, 2018, 11 pages.

\* cited by examiner

AXIAL-SEAL BUTTERFLY VALVE

CROSS-REFERENCE TO RELATED APPLICATIONS

This application is a national phase entry under 35 U.S.C. § 371 of International Patent Application PCT/US2016/045893, filed Aug. 5, 2016, designating the United States of America and published in English as International Patent Publication WO 2017/024272 A1 on Feb. 9, 2017, which claims the benefit of the filing date of U.S. Provisional Patent application Ser. No. 62/201,509, filed Aug. 5, 2015, the disclosure of which is hereby incorporated herein in its entirety by this reference.

TECHNICAL FIELD

The present disclosure relates generally to butterfly valves. More specifically, the present disclosure relates to a butterfly valve with a cam mechanism providing axial displacement of a valve closure disc against a valve seat of the butterfly valve.

BACKGROUND

Butterfly valves, in general, are well known and widely employed due to their simplicity of construction and relatively inexpensive cost, as compared to more complicated and detailed plug and ball valves. A typical butterfly valve generally comprises a disc mounted for rotation between the open position, in which the disc lies substantially parallel to the axis of the fluid flow channel through the valve, and the closed position, in which the disc lies perpendicularly to this axis. The disc is mounted for rotation on a valve stem or shaft, which is attached to the disc on one side. The disc cooperates with an annular flexible seat circumscribing the fluid flow channel for the purpose of effecting a resilient seal against the disc to shut off fluid flow through the channel. The annular flexible seat is conventionally held in position by being clamped in a recess formed between complementary surfaces of a portion of the valve body and a valve seat retainer.

During rotation of the disc between the open position and the closed position, the peripheral edges of the disc, particularly those nearest the axis about which the disc rotates, remain in contact with the flexible seat and experience considerable friction during rotation of the disc, causing wear on both the seat and the peripheral edges of the disk. Such wear can lead to the disc failing to seal properly against the valve seat when the disc is in the closed position. Repairing or replacing the valve seat or the disc can be time consuming and expensive. Additionally, an actuator driving the disc wastes power overcoming the sliding friction force between the disc and the valve seat.

Disclosure

This summary is provided to introduce a selection of concepts in a simplified form. These concepts are described in further detail in the detailed description of embodiments of the disclosure below. This summary is not intended to identify key features or essential features of the claimed subject matter, nor is it intended to be used to limit the scope of the claimed subject matter.

In some embodiments, a valve includes a valve body having a fluid flow path extending therethrough and a valve seat located in the valve body. The valve also includes a disc located in the fluid flow path of the valve body. The disc is rotatable between a first position and a second position about an axis substantially perpendicular to a longitudinal axis of the disc. The disc is also translatable between the second position and a third position in a direction substantially parallel to the longitudinal axis of the disc.

In additional embodiments, a fluid system includes a fluid line and a valve located within the fluid line. The valve includes a valve body having a fluid flow path extending therethrough and a valve seat located in the valve body. The valve also includes a disc located in the fluid flow path of the valve body. The disc is rotatable between a fully open position and an intermediate position about an axis substantially perpendicular to a longitudinal axis of the disc. The disc is also translatable between the intermediate position and a fully closed position in a direction substantially parallel to the longitudinal axis of the disc.

DETAILED DESCRIPTION

The illustrations presented herein are not meant to be actual views of any butterfly valve, shaft, sleeve, disc, cam mechanism, actuator, or component thereof, but are merely idealized representations that are used to describe embodiments of the disclosure.

Figure 1:
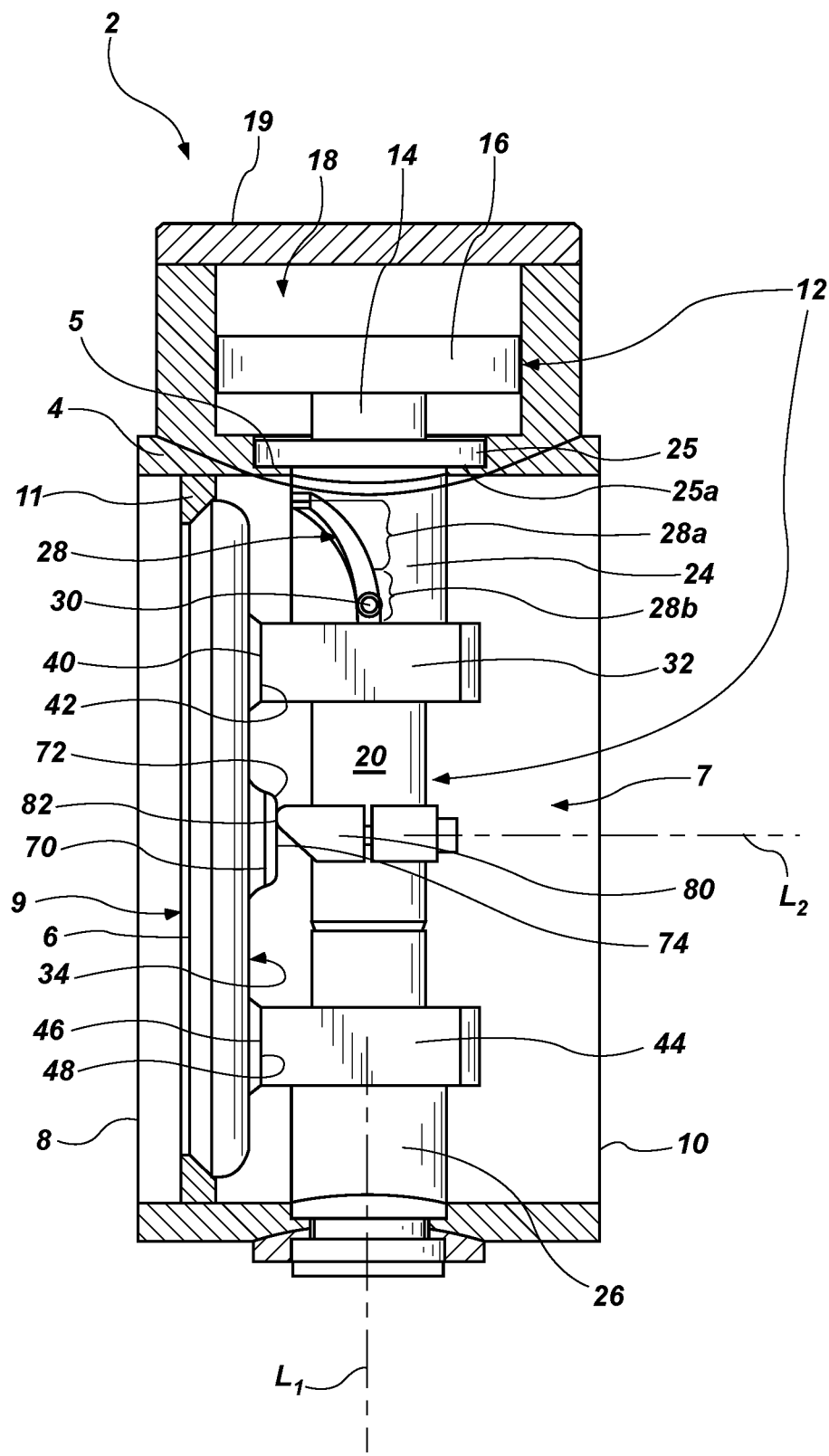
FIG. 1 illustrates a partially cutaway side view of a butterfly valve in a closed position, according to an embodiment of the present disclosure.

FIG. 1 illustrates a side view of a butterfly valve 2 having a valve body 4 housing a valve disc 6 located within a fluid flowpath 7 of the valve body 4 between a fluid inlet 8 and a fluid outlet 10 of the valve 2. When the butterfly valve 2 is in a closed position, as shown in FIG. 1, a periphery of a first side 9, or "front side," of the disc 6 may sealingly engage a valve seat 11 in a manner inhibiting flow of fluid between the disc 6 and the valve seat 11. The valve seat 11 may be a seat ring. While the inlet 8 is shown in FIG. 1 as being on the side of the valve 2 proximate the seat ring 11, it is to be appreciated that the valve 2 may be positioned such that fluid may flow in either direction through the valve body 4. For example, the fluid inlet 8 may be located on a side of the valve opposite the seat ring 11 and the fluid outlet 10 may be located on the side of the valve 2 proximate the seat ring 11.

The valve 2 may include an actuation unit 12 operatively coupled to the disc 6 and configured to move the disc 6 between a fully open position to a fully closed position. The actuation unit 12 may include a piston 14 having a piston head 16 located within a cylinder 18 formed in the valve body 4. A top of the cylinder 18 may be enclosed by a cap 19. The actuation unit 12 may also include a shaft 20 extending from the piston head 16 and through the valve flowpath 7 and into a sleeve located on a side of the valve body 4 opposite the cylinder 18, as disclosed in more detail below. The piston 14 and the shaft 20 may be constrained by one or more components of the valve body 4 against axial rotation. The piston 14 may be pneumatically operated, hydraulically operated, or electrically operated, by way of non-limiting example.

With continued reference to FIG. 1, actuation of the piston 14 moves the shaft 20 axially within the valve body 4. An upper portion of the shaft 20 proximate the piston head 16 may extend within a drive sleeve 24 rotatably coupled to the valve body. An upper end of the drive sleeve 24 may have a flange 25 received in a recess of the valve body 4, wherein a bottom surface 25a of the flange 25 may be positioned adjacent a recessed surface 5 in the valve body 4 in a manner constraining the drive sleeve 24 from axial translation while allowing the drive sleeve 24 to rotate axially. A thrust bearing (not shown) may be located between the bottom surface 25a of the flange 25 and the recessed surface 5 of the valve body 4.

A lower end 22 of the shaft 20 may extend within a driven sleeve 26 rotatably coupled to the valve body 4. The driven sleeve 26 may be coupled to the valve body 4 between a recess 27 in an inner surface of the valve body 4 and a guide stud 29 extending through the valve body 4 in a manner constraining the driven sleeve 26 from axial translation while allowing the driven sleeve 26 to rotate axially. A thrust bearing (not shown) may be located between a bottom surface of the driven sleeve 26 and the recess 27 of the valve body 4.

In the configuration of the actuation unit 12 previously described, the piston 14, the shaft 20, the drive sleeve 24 and the driven sleeve 26 may be coaxially aligned within the valve body 4 along a first longitudinal axis $L_1$. Thus, the first longitudinal axis $L_1$ may be termed "a longitudinal $L_1$ axis of the actuation unit 12." As previously described, the drive sleeve 24 and the driven sleeve 26 may each be constrained within the valve body 4 in a manner preventing axial translation of each of the drive sleeve 24 and the driven sleeve 26 while allowing rotation of the drive sleeve 24 and the driven sleeve 26 about the first longitudinal axis $L_1$.

Figure 4:
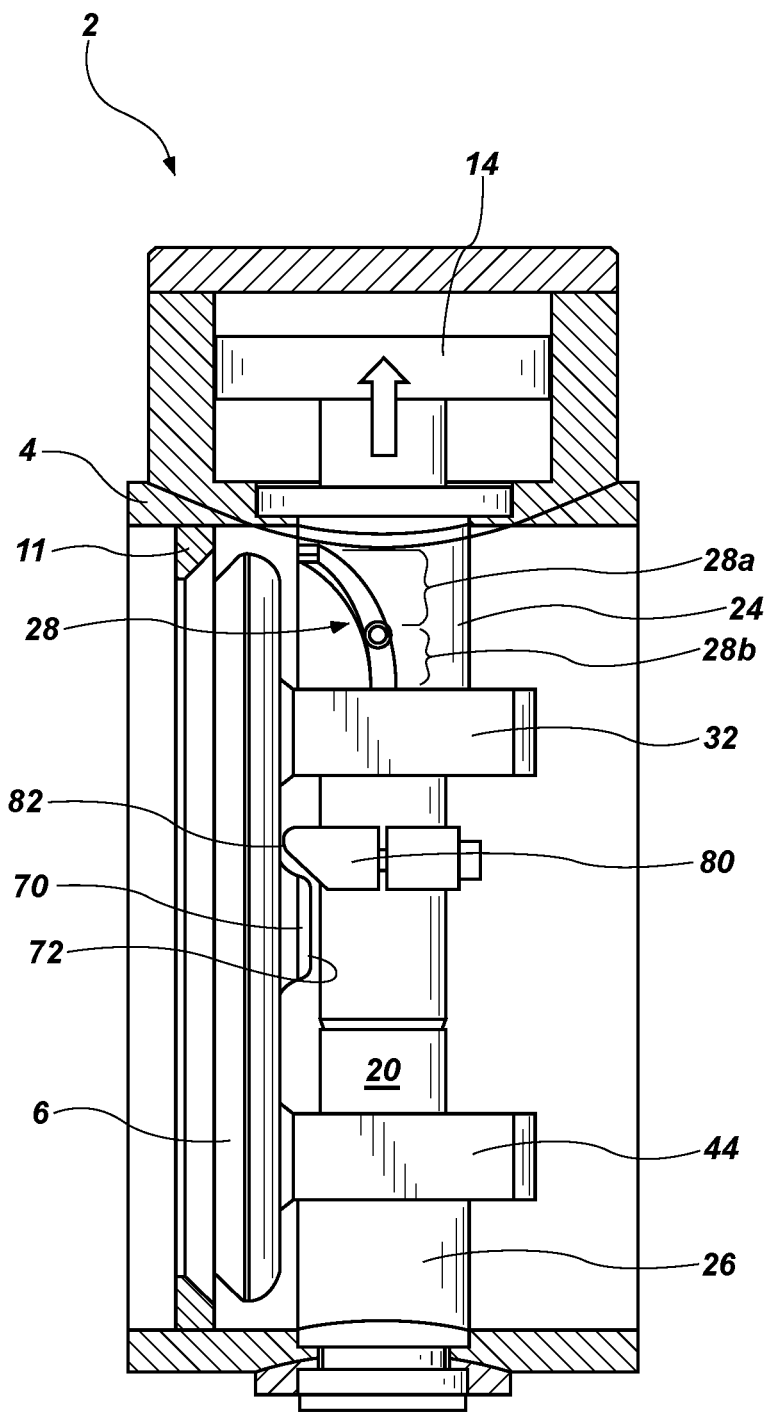
FIG. 4 illustrates a partially cutaway side view of the butterfly valve of FIG. 1 in an intermediate position, according to an embodiment of the present disclosure.

A camming groove 28 may be formed through a wall of the drive sleeve 24 and may interact with a cam follower 30 extending radially outward from the shaft 20 and received in the camming groove 28. The camming groove 28 may extend about 90 degrees about the circumference of the drive sleeve 24. The cam follower 30 may be in the form of a pin or protrusion extending radially outward from the shaft 20. The camming groove 28 may have a generally arcuate profile. The camming groove 28 may have a first portion 28a configured to interact with the cam follower 30 to cause rotation of the drive sleeve 24 and a second portion 28b configured to allow the cam follower 30 to translate therein substantially without causing rotation of the drive sleeve 24. The first and second portions 28a, 28b of the camming groove 28 may transition smoothly therebetween. It is noted that the valve 2 of FIG. 4 illustrates the cam follower 30 located at the transition point between the first portion 28a and the second portion 28b of the camming groove 28. The position shown in FIG. 4 may be termed an "intermediate" position of the valve 2.

The first portion 28a of the camming groove 28 may have a constant radius or a varying radius, wherein the radius at each location of the first portion 28a of the camming groove 28 is sufficiently small enough such that translation of the cam follower 30 within the first portion 28a of the camming groove 28 causes the cam follower 30 to interact with the walls of the drive sleeve 24 on either side of camming groove 28 to impart a tangential force to the drive sleeve 24 sufficient to rotate the drive sleeve 24 about the longitudinal axis $L_1$ thereof. Thus, the first portion 28a of the camming groove 28 may be termed an "active" portion of the camming groove 28.

Conversely, the second portion 28b of the camming groove 28 may be linear or substantially linear such that translation of the cam follower 30 within the second portion 28b of the camming groove 28 substantially does not impart a tangential force to the drive sleeve 24 sufficient to rotate the drive sleeve 24 about the longitudinal axis $L_1$ thereof. Thus, the second portion 28b of the camming groove may be termed a "dwell" portion of the camming groove 28. It is to be appreciated that the second portion 28b of the camming groove 28 may be generally arcuate but having a radius of curvature sufficiently large enough such that translation of the cam follower 30 within the second portion 28b of the camming groove 28 imparts a tangential force to the drive sleeve 24 sufficient to only minimally or negligibly rotate the drive sleeve 24 about the longitudinal axis $L_1$ thereof.

As shown in FIG. 1, the active portion 28a of the camming groove 28 may be located proximate an upper end of the drive sleeve 24 and the dwell portion 28b of the camming groove 28 may be located proximate a bottom end of the drive sleeve 24. However, it is to be appreciated that, in other embodiments (not shown), the active portion 28a of the camming groove 28 may be located proximate the bottom end of the drive sleeve 24 and the dwell portion 28b may be located proximate the upper end of the drive sleeve 24.

Figure 7:
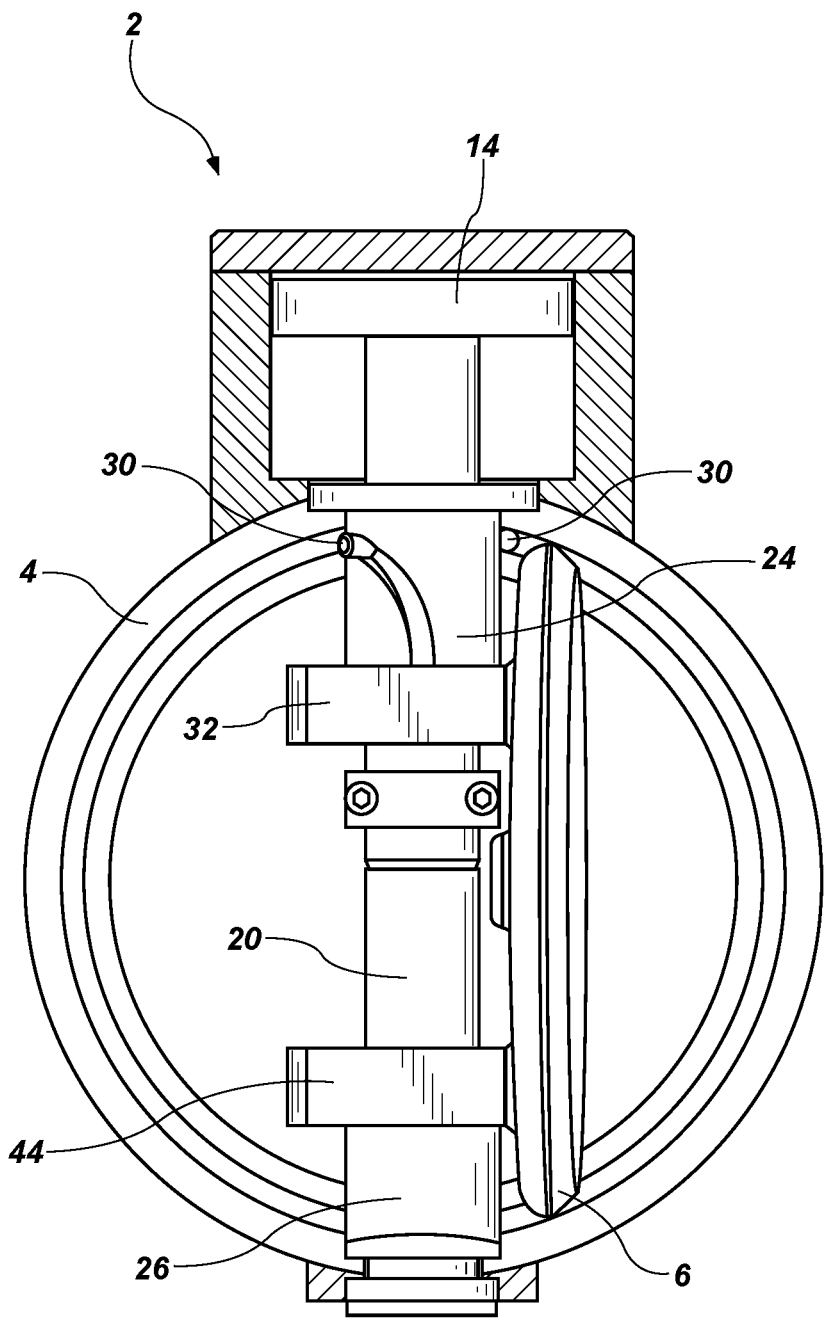
FIG. 7 illustrates a partially cutaway front view of the butterfly valve of FIG. 1 in an open position, according to an embodiment of the present disclosure.

As shown in FIG. 7, the shaft 20 may include two (2) cam followers 30 extending outward from opposing sides of the outer surface of the shaft 20, with the cam followers 30 interacting with separate camming grooves 28 formed in opposing sides of the drive sleeve 24. The cam followers 30 may be circumferentially spaced apart from one another by 90 degrees about the outer surface 58 of the shaft 20. Accordingly, the associated camming grooves 28 may also be circumferentially spaced apart from one another by about 90 degrees about the drive sleeve 24. It is to be appreciated that, in other embodiments, the drive sleeve 24 and the shaft 20 may include more than two separate camming grooves 28 and associated cam followers 30, respectively. Additionally, the cam followers 30 and associated camming grooves 28 may be asymmetrically circumferentially separated from one another.

Figure 2:
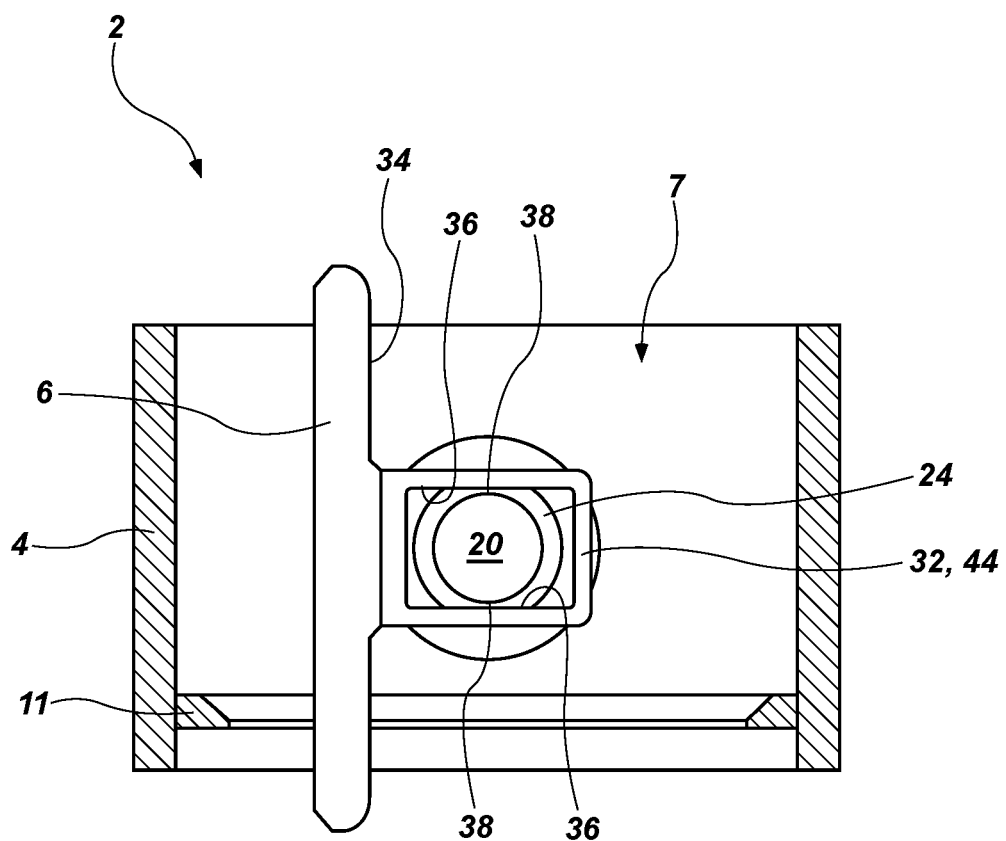
FIG. 2 illustrates a partial cross-sectional bottom view of the butterfly valve of FIG. 1 in an open position, according to an embodiment of the present disclosure.

With continued reference to FIG. 1, a bottom portion of the drive sleeve 24 may be coupled to a first bracket 32. The first bracket may be rectangular. The first bracket 32 may also be coupled to a second side 34, or "rear side," of the disc 6. Opposed inner surfaces 36 of the first bracket 32 may mate with opposed planar regions 38 formed in the outer surface of the drive sleeve 24, as shown in FIG. 2. The opposed inner surfaces 36 of the first bracket 32 and the mating planar regions 38 of the outer surface of the drive sleeve 24 may be configured to allow the first bracket 32 to slide relative to the drive sleeve 24 in a direction substantially parallel to a longitudinal axis $L_2$ of the disc 6, as described more fully below. The first bracket 32 may be coupled to the drive sleeve 24 by any means allowing the first bracket 32 to move relative to the drive sleeve 24 in a direction parallel to the longitudinal axis $L_2$ of the disc 6.

An outer surface 40 of the first bracket 32 may be coupled to a first mounting formation 42 on the rear side 34 of the disc 6. As shown, the first mounting formation 42 on the rear side 34 of the disc 6 may include a planar surface offset from the rear of the disc 6; however, other configurations are within the scope of the present disclosure. The first bracket 32 may be coupled to the first mounting formation 42 on the rear side 34 of the disc 6 by welding, brazing, adhesives, or mechanical fasteners, such as screws, bolts, pins, clamps, or any combination of the foregoing. It is to be appreciated that any manner of coupling the first bracket 32 to the rear side 34 of the disc 6 is within the scope of the present disclosure.

An upper end of the driven sleeve 26 may be coupled to a second bracket 44. The second bracket 44 may be configured similarly to the first bracket 32 described above. The second bracket 44 may also be coupled to the rear side 34 of the disc 6. As with the first bracket 32, opposed inner surfaces of the second bracket 44 may mate with opposed planar regions 38 formed in the outer surface of the driven sleeve 26. As with the first bracket 32, the opposed inner surfaces 36 of the second bracket 44 and the mating planar regions 38 of the outer surface of the driven sleeve 26 may be configured to allow the second bracket 44 to slide relative to the driven sleeve 26 in a direction substantially parallel to the longitudinal axis $L_2$ of the disc 6. The second bracket 44 may be coupled to the driven sleeve 26 by any means allowing the second bracket 44 to move relative to the driven sleeve 26 in a direction parallel to the longitudinal axis $L_2$ of the disc 6.

An outer surface 46 of the second bracket 44 may be coupled to a second mounting formation 48 on the rear side 34 of the disc 6, as shown in FIG. 1. The second mounting formation 48 on the rear side 34 of the disc 6 may include a planar surface offset from the rear of the disc 6; however, other configurations are within the scope of the present disclosure. The second bracket 44 may be coupled to the second mounting formation 48 on the rear side 34 of the disc 6 by welding, brazing, adhesives, or mechanical fasteners, such as screws, bolts, pins, clamps, or any combination of the foregoing. It is to be appreciated that any manner of coupling the second bracket 32 to the rear side 34 of the disc 6 is within the scope of the present disclosure.

Figure 3:
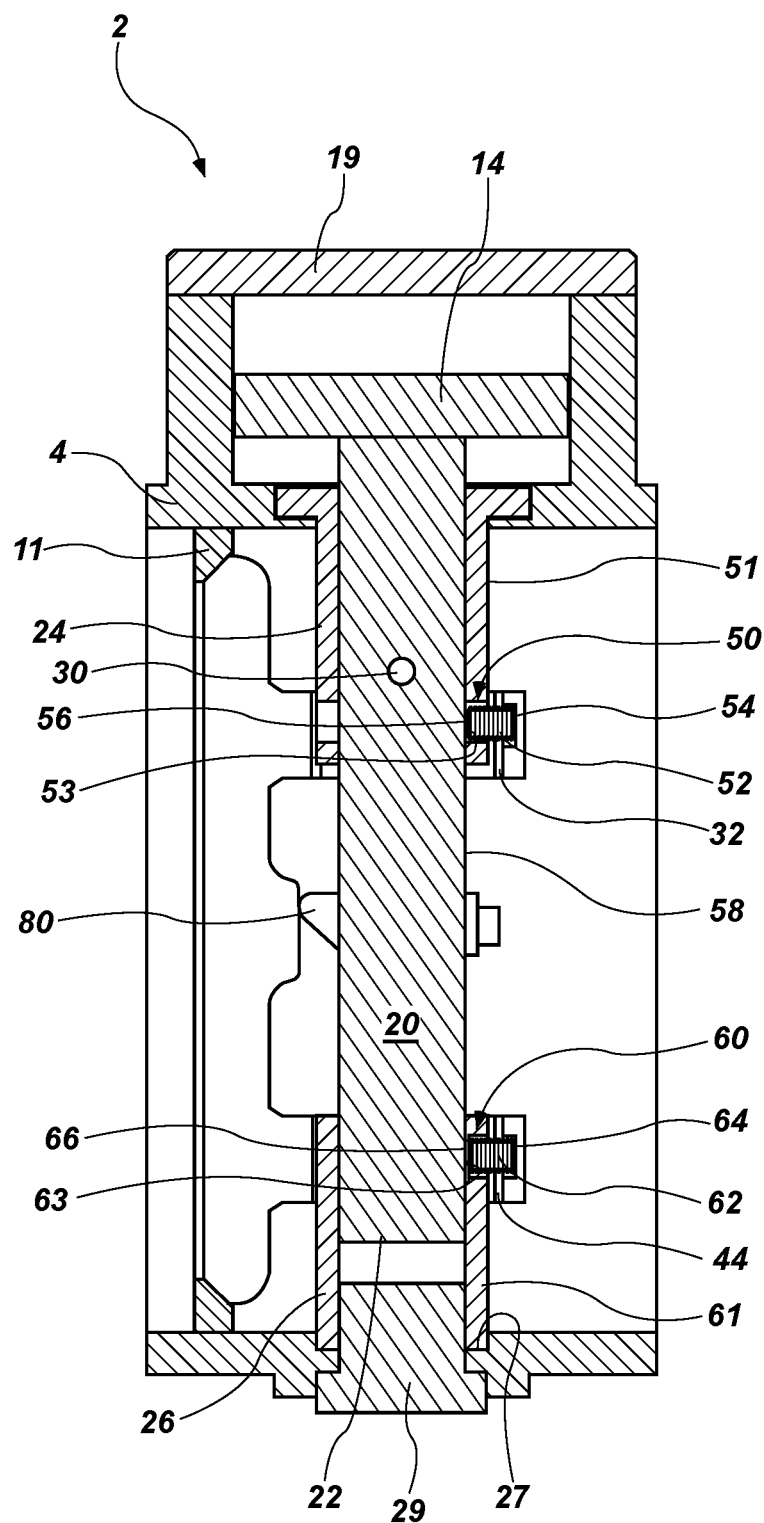
FIG. 3 illustrates a partial cross-sectional side view of the butterfly valve of FIG. 1 in a closed position, according to an embodiment of the present disclosure.

Referring now to FIG. 3, the lower end of the drive sleeve 24 may include a first recess 50 formed in an outer surface 51 of the drive sleeve 24. The recess 51 may extend radially inward through the wall of the drive sleeve 24 from the outer surface 51 of the drive sleeve 24 to a recessed surface 53 of the drive sleeve 24. A first compression spring 52 may have a first end 54 coupled to a wall of the first bracket 32 located opposite the side of the first bracket 32 coupled to the rear of the disc 6. The first compression spring 52 may extend within the first recess 50 in the wall of the drive sleeve 24, wherein an opposed, second end 56 of the first compression spring 52 may abut against the recessed surface 53 of the drive sleeve 24.

Similarly, the upper end of the driven sleeve 26 may include a second recess 60 formed in an outer surface 61 of the driven sleeve 26. The second recess 61 may extend radially inward through the wall of the driven sleeve 26 from the outer surface 61 of the driven sleeve 26 to a recessed surface 63 of the driven sleeve 26. A second compression spring 62 may have a first end 64 coupled to a wall of the second bracket 44 located opposite the side of the second bracket 44 coupled to the rear of the disc 6. The second compression spring 62 may extend within the second recess 60 in the wall of the driven sleeve 26, wherein an opposed, second end 66 of the second compression spring 62 may abut against the recessed surface 63 of the driven sleeve 26. In this manner, the first and second compression springs 52, 62 may bias the first and second brackets 32, 44, respectively, and the disc 6 coupled thereto, away from the seat ring 11 in a direction substantially parallel to the longitudinal axis $L_2$ of the disc 6. It is to be appreciated that other configurations for coupling the compression springs 52, 62 to the brackets 32, 44 and the drive sleeve 24 and the driven sleeve 26 are also within the scope of the present disclosure. Because the drive sleeve 24, the camming groove 28 of the drive sleeve 24, the cam follower 30 of the shaft 20, the driven sleeve 26, and the brackets 32, 44 collectively convert linear motion of the piston 14 and the shaft 20 into rotational motion of the disc, these components of the valve 2 may be termed a "linear-to-rotary transmission unit."

It is to be appreciated that, in other embodiments, other spring elements may be utilized in place of the compression springs 52, 62 to provide a force biasing the brackets 32, 44, and the disc 6 coupled thereto, away from the seat ring 11 in a direction substantially parallel to the longitudinal axis $L_2$ of the disc 6. Any type of spring element biasing the disc 6 away from the seat ring 11 in a direction substantially parallel to the longitudinal axis $L_2$ of the disc 6 is within the scope of the present disclosure.

As shown in FIGS. 1 and 3, the rear side 34 of the disc 6 may include a protrusion or boss 70 located between the first and second mounting formations 42, 48 on the rear side 34 of the disc. The boss 70 may have a circular shape when viewed in a plane perpendicular to the longitudinal axis $L_2$ of the disc 6; however, other shapes are also within the scope of the present disclosure. The boss 70 may have rounded edges 72 at a periphery thereof, wherein the peripheral surface of the boss 70 may have a smooth and continuous transition with the rear side 34 of the disc 6. The boss 70 may include a substantially planar surface 74 centrally located thereon. A secondary cam 80 may be rigidly affixed to the shaft 20 and may be located axially between the first and second brackets 32, 44. The secondary cam 80 may include a rounded cam surface 82 configured to abut the substantially planar surface 74 of the boss 70 on the rear of the disc 6 when the disc 6 is near the closed position.

Operation of the butterfly valve 2 according to the embodiment disclosed herein will now be described. When the valve disc 6 is in the fully closed position, as shown in FIGS. 1 and 3, the cam followers 30 on the shaft 20 are positioned within the associated camming grooves 28 in the drive sleeve 24 at a lower extent of the dwell portions 28b thereof, while, contemporaneously, the rounded cam surface 82 of the secondary cam 80 abuts the substantially planar surface 74 of the boss 70 extending from the rear of the disc 6, thus maintaining the disc 6 in sealing engagement with the seat ring 11.

Figure 5:
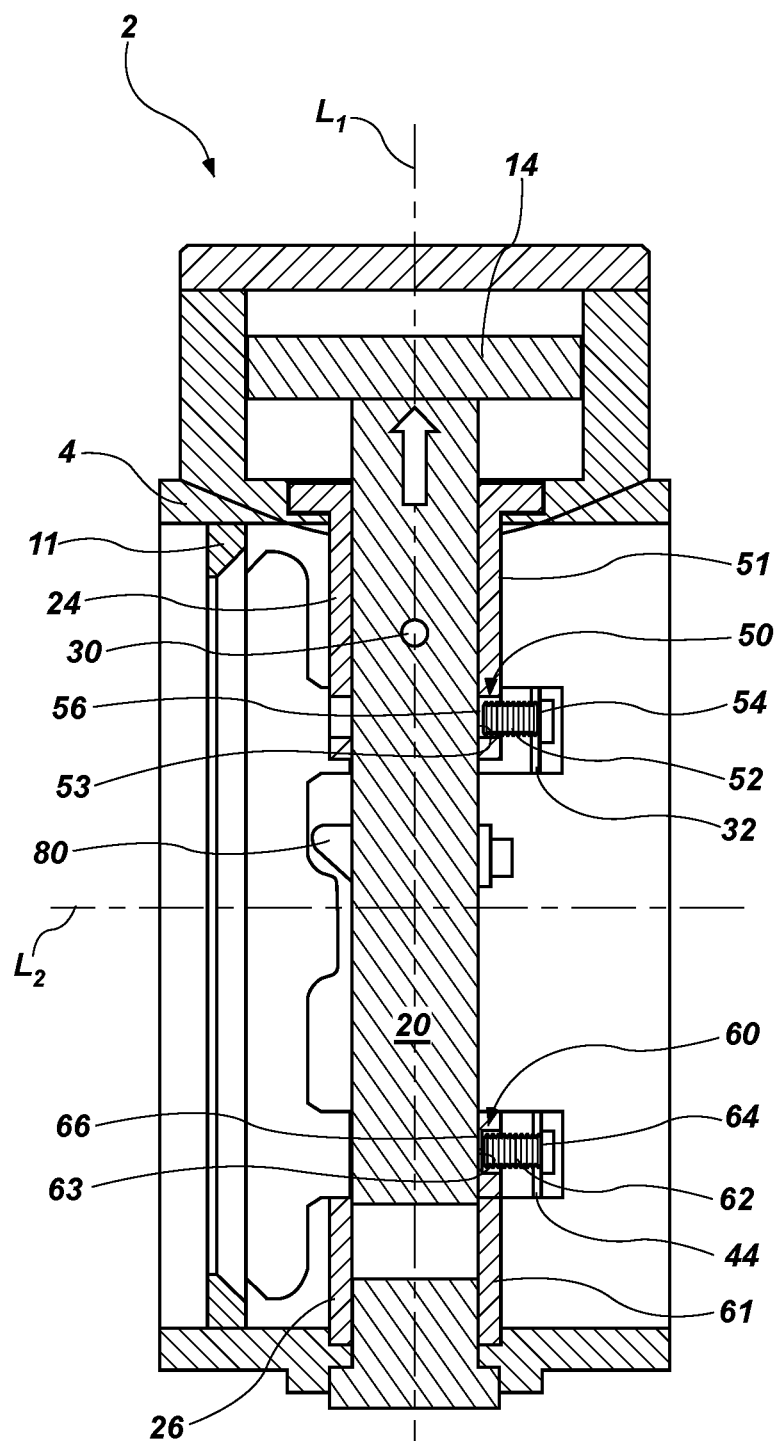
FIG. 5 illustrates a partial cross-sectional side view of the butterfly valve of FIG. 1 in an intermediate position, according to an embodiment of the present disclosure.

Referring now to FIGS. 4 and 5, the butterfly valve 2 is shown in an intermediate position. As the piston 14 and the shaft 20 translate axially upward such that the cam followers 30 move vertically within the dwell portions 28b of the camming grooves 28, the secondary cam 80, which is rigidly coupled to the shaft 20, correspondingly translates upward and out of contact with the boss 70, allowing the compression springs 52, 62 to force the brackets 32, 44, and the disc 6 attached thereto, to translate away from the seat ring 11, in a direction substantially parallel to a longitudinal axis $L_2$ of the disc 6, to the intermediate position shown in FIGS. 4 and 5. In this manner, upward axial translation of the piston 14 and shaft 20 with the cam followers 30 in the dwell portions 28b of the associated camming grooves 28 causes the entire valve disc 6 to translate directly away from, and out of sealing engagement with, the seat ring 11 in a direction substantially parallel to the longitudinal axis $L_2$ of the disc 6 substantially without any rotation (or with minimal or negligible rotation) of the disc 6.

Figure 6:
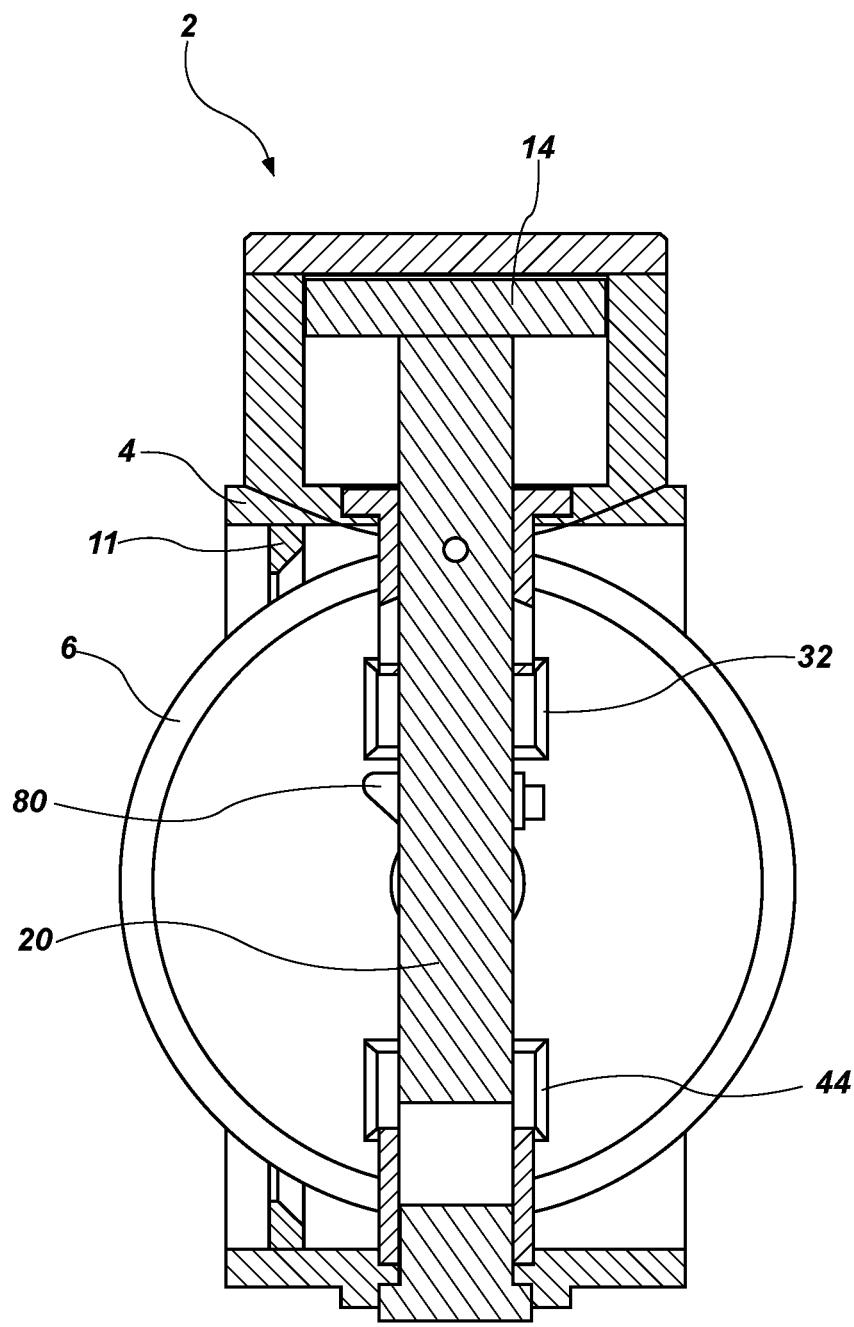
FIG. 6 illustrates a partial cross-sectional side view of the butterfly valve of FIG. 1 is an open position, according to an embodiment of the present disclosure.

Referring now to FIGS. 6 and 7, the butterfly valve 2 is shown in a fully open position with the disc 6 oriented substantially perpendicular to the seat ring 11, allowing flow of fluid through the valve body 4. Beginning from the intermediate position of the butterfly valve 2 shown in FIGS. 4 and 5, as the piston 14 and the shaft 20 continue translating upward such that the cam followers 30 move from the dwell portions 28b to the active portions 28a of the associated camming grooves 28 of the drive sleeve 24, interaction between the cam followers 30 and the active portions 28a of the camming grooves 28 imparts a tangential force to the drive sleeve 24, causing rotation of the drive sleeve 24 about the longitudinal axis $L_1$ of the drive sleeve 24. At the fully open position of the butterfly valve 2, the piston 14 may be positioned at the top of its stroke, with each of the cam followers 30 of the shaft 20 positioned at an apex of the active portions 28a of the associated camming groove 28 of the drive sleeve 24.

To close the butterfly valve 2, the piston 14 may be actuated to translate axially downward, which may immediately cause rotation of the disc 6 about a longitudinal axis substantially perpendicular to the longitudinal axis $L_2$ of the disc 6 by virtue of interaction between the cam followers 30 of the shaft 20 and the active portions 28a of the associated camming grooves 28 of the drive sleeve 24. Because the compression springs 52, 62 bias the brackets 32, 44, and the disc 6 coupled thereto, away from the seat ring 11, the disc 6 may rotate eccentrically about the longitudinal axis $L_1$ of the shaft 20. The camming grooves 28 may be configured such that, once the shaft 20 has translated axially downward so that the cam followers 30 enter the dwell portions 28b of the associated camming grooves 28, the disc 6 has rotated about 90 degrees about the longitudinal axis $L_1$ of the shaft 20 such that the disc 6 is substantially coaxially aligned with the seat ring 11. Thereafter, as the piston 14 and the shaft 20 continue downward such that the cam followers 30 correspondingly move downward within the dwell portions 28b of the associated camming grooves, the rounded cam surface 82 of the secondary cam moves into contact with the boss 70. As the cam surface 82 of the secondary cam 80 moves downward after contacting the boss 70, interaction of the cam surface 82 with the rounded edges 72 of the boss 70 forces the disc 6 to translate along its longitudinal axis $L_2$ into the seat ring 11. In the fully closed position, the cam surface 82 of the secondary cam 80 abuts against the planar surface 74 of the boss 70, maintaining the periphery of the front side 9 of the disc 6 in sealing engagement with the seat ring 11. In this manner, downward axial translation of the piston 14 and shaft 20 with the cam followers 30 in the dwell portions 28b of the associated camming grooves 28 causes the entire valve disc 6 to translate directly toward, and into sealing engagement with, the seat ring 11 in a direction parallel to the longitudinal axis $L_2$ of the disc 6 substantially without any rotation (or with minimal or negligible rotation) of the disc 6 about the longitudinal axis $L_1$ of the shaft 20.

It is to be appreciated that the boss 70 may have any of various configurations. For example, as an alternative to the planar surface 74 against which the secondary cam 80 contacts when the valve 2 is in the fully closed position, the boss 70 may include a contoured surface having a constant slope or a continuously varying slope (not shown). Other configurations of the boss 70 are within the scope of the present disclosure.

While FIGS. 1-7 illustrate the fully closed position of the disc 6 corresponding to the piston 14 being positioned at the bottom of its stroke and the fully open position of the disc 6 corresponding to the piston 14 being positioned at the top of its stroke, it is to be appreciated that, in other embodiments, the valve 2 may be configured such the disc 6 is in the fully closed position when the piston 14 is positioned at the top of its stroke and the disc 6 is in the fully open position when the piston 14 is positioned at the bottom of its stroke. In such embodiments (not shown), the active portion 28a of the camming groove 28 may be located proximate the bottom end of the drive sleeve 24 and the dwell portion 28b may be located proximate the upper end of the drive sleeve 24, such that axial translation of the piston 14 near the top of its stroke causes the cam follower 30 to translate within the dwell portion 28b, thus allowing the secondary cam 80 to move out of contact with the boss 70 as the piston 14 translates downward (causing the disc 6 to translate axially away from the seat ring 11 to the intermediate position) and allowing the secondary cam 80 to move into contact with the boss 70 as the piston 14 translates upward with the cam follower 30 within the dwell portion 28b of the camming groove 28 (causing the disc 6 to translate from the intermediate position into sealing engagement with the seat ring 11). In such embodiments, axial translation of the piston 14 near the bottom of its stroke causes the cam follower 30 to translate within the active portion 28a of the camming groove 28, thus causing the cam follower 30 to rotate the drive sleeve 24 and, by extension, the disc 6, from the intermediate position to the fully open position as the piston 14 translates downward and causing the cam follower 30 to rotate the drive sleeve 24 and, by extension, the disc 6, from the fully open position to the intermediate position as the piston 14 translates upward.

Figure 8:
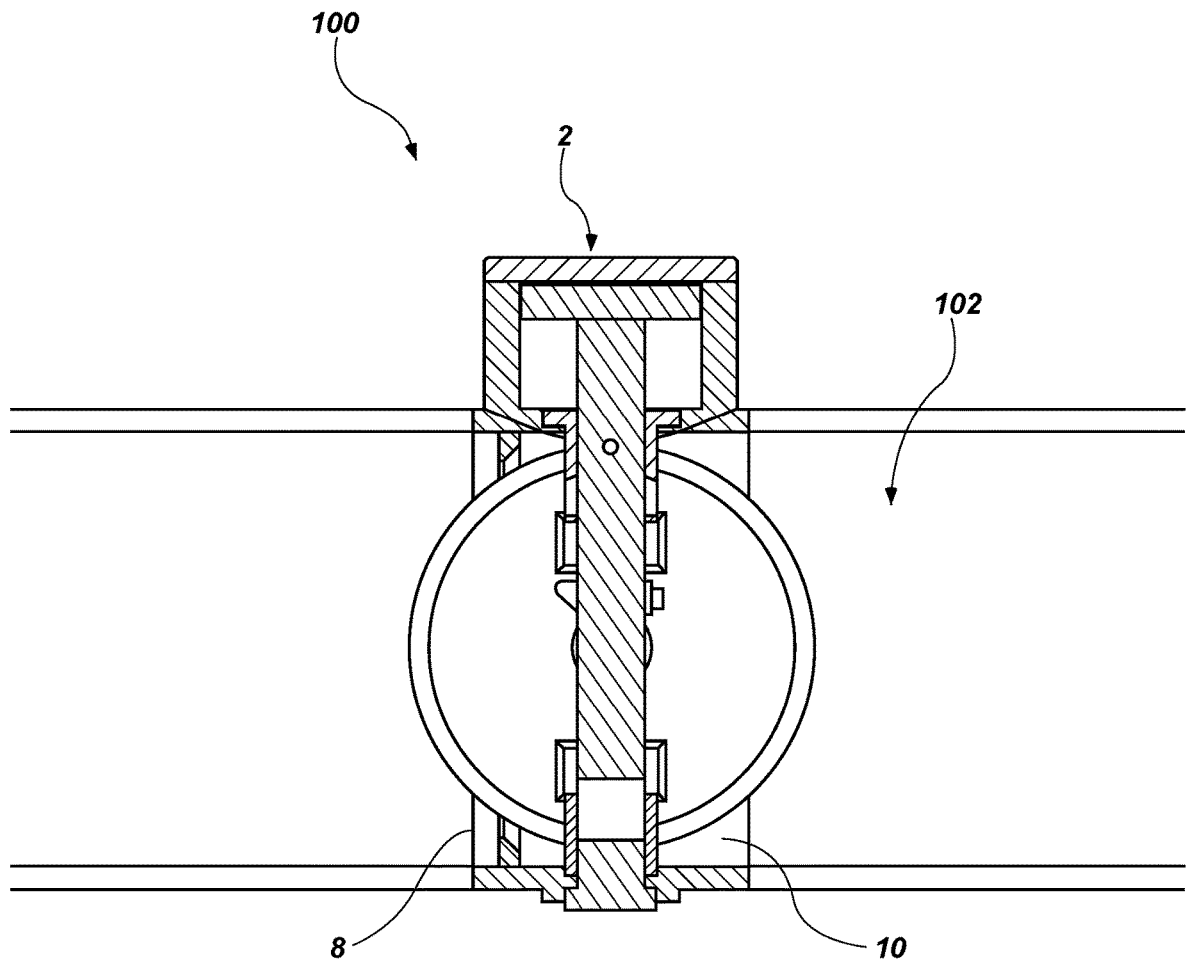
FIG. 8 illustrates an elevation view of a portion of a fluid system incorporating a valve, such as any of the valves of FIGS. 1-7.

Referring now to FIG. 8, the butterfly valve 2 is shown utilized in a fluid system 100. For example, the valve 2 may be located in a fluid line 102 and may be operated to control flow of fluid through the valve 2.

It is to be appreciated that a butterfly valve 2 configured as disclosed herein provides the valve disc 6 with two (2) different modes of motion during opening and closing of the valve 2. The first mode of motion being translation of the disc 6 in a direction parallel to the longitudinal axis $L_2$ of the disc 6. This first mode of motion occurs between the fully closed position of the valve 2 and the intermediate position of the valve 2. In this manner, the entire periphery of the front side 9 of the valve disc 6 can retract axially from the valve seat 11 at the commencement of an opening stroke of the valve 2. Additionally, the entire periphery of the front side 9 of the valve disc 6 can be pressed against the valve seat 11 in a sealing engagement at the conclusion of a closing stroke of the valve 2. Thus, the disc 6 of the butterfly valve 2 operates with a plug seal motion between the fully closed position and the intermediate position, significantly reducing sliding, rubbing and associated friction between the disc 6 and the valve seat 11, prolonging the operational life of both the disc 6 and the valve seat 11.

The second mode of motion of the valve disc 6 is rotation of the valve disc 6 about 90 degrees about the longitudinal axis $L_1$ of the shaft, which is positioned substantially perpendicular to the longitudinal axis $L_2$ of the disc 6. Because the entire valve disc 6 is offset from the valve seat 11 along to the longitudinal axis $L_2$ of the disc 6 when the valve 2 is in the intermediate position, the disc 6 may be rotated faster between the intermediate position and the fully open position without causing friction between the disc 6 and the valve seat 11. This allows for a faster valve stroke compared to that of prior art butterfly valves. Additionally, the absence of friction between the valve disc 6 and the valve seat 11 between the intermediate position and the fully open position of the valve 2 decreased the work necessary to move the valve disc 6 from the fully closed position to the fully open position, requiring less pressure and cylinder volume to actuate the piston 14 to drive the valve 2.

The butterfly valve 2 disclosed herein also provides advantages in simplicity of design, construction, service and repair. The actuation unit 12 is fully integrated into the valve 2 with liner motion of the piston 14 transmitted to rotary motion of the disc 6 within the valve body 4. Furthermore, the shaft 20 of the piston 14 doubling as the butterfly shaft of the valve disc 6 favorably reduces the amount of components present in the valve 2. Additionally, linear-to-rotary transmission components, including the piston 14, the shaft 10, the drive sleeve 24 and the driven sleeve 26 are all coaxial, allowing for an efficient, compact and robust design, with individual components that can be manufactured with greater ease compared to those of prior art butterfly valves. Additionally, the piston 14 of the butterfly valve 2 disclosed herein can be serviced with less work than prior art butterfly valves. For example, the piston 14 can be accessed by simply removing the cap 19 of the cylinder 18 without removing the piston 14 from the valve 2 or removing the valve 2 from the fluid line. For example, to service, repair or replace the piston rings or other piston sealing elements, the cap 19 may be removed from the valve body 4, the piston 14 may be lifted while remaining coupled to the drive sleeve 24 and the driven sleeve 26 within the valve body 4, providing the access necessary to accomplish the desired servicing and/or repair.

The embodiments of the disclosure described above do not limit the scope of the disclosure, which is defined by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those of ordinary skill in the art from the description. Such modifications and embodiments also fall within the scope of the appended claims.

What is claimed is:

1. A valve, comprising:
   a valve body having a fluid flow path extending therethrough;
   a valve seat located in the valve body;
   a disc located in the fluid flow path of the valve body, the disc rotatable between a first position and a second position about an axis substantially perpendicular to a longitudinal axis of the disc, the disc translatable between the second position and a third position in a direction substantially parallel to the longitudinal axis of the disc;
   an actuation unit operatively coupled to the disc, wherein the actuation unit comprises a piston, a shaft of the piston extending within the fluid flow path of the valve body, wherein the actuation unit further comprises a spring element operatively coupled to the shaft and the disc, the spring element imposing a biasing force on the disc in a direction away from the valve seat and substantially parallel with the longitudinal axis of the disc; and a second cam coupled to the shaft is configured to be out of contact with the surface of the disc located on the side of the disc opposite the valve seat when the disc is in the second position, the first position, and any position between the first and second positions.

2. The valve unit of claim 1, wherein the piston is configured to be operated pneumatically, hydraulically or electrically.

3. The valve of claim 1, wherein the shaft is coupled to a linear-to-rotary transmission unit, the linear-to-rotary transmission unit converting linear motion of the shaft to rotary motion of the disc.

4. The valve of claim 3, wherein the linear-to-rotary transmission unit comprises:
   a sleeve coaxially surrounding a portion of the shaft, the sleeve operatively coupled to the disc, a wall of the sleeve having a camming groove formed therein, the camming groove having a first portion and a second portion;
   a cam follower extending radially outward from an outer surface of the shaft, the cam follower positioned within the camming groove, wherein the cam follower and the camming groove are configured such that motion of the cam follower, within the first portion of the camming groove, in a direction parallel with a longitudinal axis of the shaft causes rotation of the sleeve.

5. The valve of claim 1, wherein the secondary cam configured to abut a surface of the disc located on a side of the disc opposite the valve seat when the disc in in the third position, the cam positioning the disc in sealing engagement with the valve seat when the disc is in the third position.

6. The valve of claim 5, wherein the cam follower of the shaft is located within the second portion of the camming groove when the disc is in the third position.

7. The valve of claim 6, wherein the actuation unit further comprises a bracket coupling the drive sleeve to the disc, the bracket rigidly coupled to the disc, the bracket coupled to the drive sleeve in a manner allowing translation of the bracket relative to the drive sleeve in a direction substantially parallel with the longitudinal axis of the disc.

8. The valve of claim 6, wherein the spring element comprises a compression spring interposed between a portion of the bracket and the drive sleeve, the compression spring imposing a biasing force on the bracket in a direction away from the valve seat and parallel with the longitudinal axis of the disc.

9. The valve of claim 5, wherein the surface of the disc located on the side of the disc opposite the valve seat, against which the secondary cam is configured to abut when the disc is in the third position, is located on a boss formed on the side of the disc opposite the valve seat.

10. A fluid system, comprising:
    a fluid line;
    a valve located within the fluid line, the valve comprising:
    a valve body having a fluid flow path extending therethrough;
    a valve seat located in the valve body;
    a disc located in the fluid flow path of the valve body, the disc rotatable between a fully open position and an intermediate position about an axis substantially perpendicular to a longitudinal axis of the disc, the disc translatable between the intermediate position and a fully closed position in a direction substantially parallel to the longitudinal axis of the disc;

an actuation unit operatively coupled to the disc, wherein the actuation unit comprises a piston, a shaft of the piston extending within the fluid flow path of the valve body, wherein the actuation unit further comprises a spring element operatively coupled to the shaft and the disc, the spring element imposing a biasing force on the disc in a direction away from the valve seat and substantially parallel with the longitudinal axis of the disc; and a second cam coupled to the shaft is configured to be out of contact with the surface of the disc located on the side of the disc opposite the valve seat when the disc is in the intermediate position, the fully open position, and any position between the fully open and intermediate positions.

11. The fluid system of claim 10, wherein the actuation unit further comprise a linear-to-rotary transmission unit coupled to the shaft of the piston, the linear-to-rotary transmission unit comprising:

a sleeve coaxially surrounding a portion of the shaft, the sleeve operatively coupled to the disc, a wall of the sleeve having a camming groove formed therein, the camming groove having an first portion and a second portion;

a cam follower extending radially outward from an outer surface of the shaft, the cam follower positioned within the camming groove, wherein the cam follower and the camming groove are configured such that motion of the cam follower, within the first portion of the camming groove, in a direction parallel with a longitudinal axis of the shaft causes rotation of the sleeve.

12. The fluid system of claim 10, wherein the secondary cam configured to abut a surface of the disc located on a side of the disc opposite the valve seat when the disc in in the fully closed position, the cam positioning the disc in sealing engagement with the valve seat when the disc is in the fully closed position, and the cam follower of the shaft being located within the second portion of the camming groove when the disc is in the fully closed position.

13. The fluid system of claim 12, wherein the actuation unit is configured such that the spring element translates the disc away from the valve seat in a direction substantially parallel with the longitudinal axis of the disc when the secondary cam is out of contact with the surface of the disc located on the side of the disc opposite the valve seat.

* * * * *